(12) United States Patent
Jin (10) Patent No.: US 9,224,340 B2
(45) Date of Patent: Dec. 29, 2015

(54) PREDICTIVE POWER CONTROL IN A FLAT PANEL DISPLAY

(75) Inventor: Xuecheng Jin, Palo Alto, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 386 days.

(21) Appl. No.: 13/479,071

(22) Filed: May 23, 2012

(65) Prior Publication Data

US 2013/0314391 A1    Nov. 28, 2013

(51) Int. Cl.
G09G 5/00 (2006.01)
G09G 3/34 (2006.01)
H02M 1/14 (2006.01)
H02M 3/07 (2006.01)
H02J 7/00 (2006.01)

(52) U.S. Cl.
CPC ............... *G09G 3/3406* (2013.01); *H02J 7/00* (2013.01); *H02M 1/14* (2013.01); *H02M 3/07* (2013.01); *G09G 2330/02* (2013.01); *G09G 2330/021* (2013.01); *G09G 2330/028* (2013.01); *G09G 2360/16* (2013.01)

(58) Field of Classification Search
CPC . G09G 3/3696; G09G 3/3291; G09G 3/3208; G09G 3/3233; G09G 5/00; G09G 2320/043; G09G 3/3258; G09G 3/3648
USPC ............. 345/102, 94, 98, 84, 48, 52–54, 212; 315/169.3; 349/70, 61
See application file for complete search history.

(56) References Cited

U.S. PATENT DOCUMENTS

| | | | | |
|---|---|---|---|---|
| 5,945,970 | A | * | 8/1999 | Moon et al. ................. 345/92 |
| 8,542,181 | B2 | * | 9/2013 | Smith et al. ................ 345/102 |
| 2007/0001998 | A1 | * | 1/2007 | Smith et al. ................ 345/102 |

FOREIGN PATENT DOCUMENTS

| | | |
|---|---|---|
| CN | 1346122 A | 4/2002 |
| CN | 1710636 A | 12/2005 |
| CN | 1892305 A | 1/2007 |

OTHER PUBLICATIONS

Compact LCD Bias Supply for TFT-LCD TV Panels, Description, Texas instuments, Published Apr. 2007, pp. 1 to 42.*
Chinese Office Action, Chinese Application No. 2013101833677, Feb. 28, 2015, 11 pages.
Korean Office Action, Korean Application No. 10-2013-0058276, May 20, 2014, 4 pages.
Chinese Second Office Action, Chinese Application No. 201310183367.7, Oct. 21, 2015, 6 pages.

* cited by examiner

*Primary Examiner* — Olga Merkoulova
(74) *Attorney, Agent, or Firm* — Fenwick & West LLP (57) ABSTRACT

A Predictive Power Control (PPC) device within a TCON Bias IC that addresses an overdesign inefficiency and enables a low cost solution. A PPC block utilizes the next frame image data and interacts with a pulse width modulation (PWM) control block of internal regulators to proactively prepare the output voltages of a power regulator for the power requirements in one or more future frames, for example.

25 Claims, 5 Drawing Sheets

PREDICTIVE POWER CONTROL IN A FLAT PANEL DISPLAY

BACKGROUND OF THE INVENTION

1. Field of the Invention

The present invention relates to power control devices for flat panel displays and, more specifically, to a system for using future image information to prepare output voltages for flat panel displays.

2. Description of the Related Arts

Light-emitting diodes (LEDs) are being adopted in a wide variety of electronics applications, for example, architectural lighting, automotive head and tail lights, backlights for liquid crystal display devices including personal computer, laptops, high definition TVs, flashlights, etc. Compared to conventional lighting sources such as incandescent lamps and fluorescent lamps, LEDs have significant advantages, including high efficiency, good directionality, color stability, high reliability, long lifetime, small size, and environmental safety.

LEDs are current-driven devices, meaning that the luminous flux (i.e., brightness) generated from them is primarily a function of the current applied through them. Thus regulating the current through the LEDs is an important control technique. To drive a large array of LEDs from a direct current (DC) voltage source, DC-DC switching power converters such as a boost or buck-boost power converters are often used to supply the top rail voltage for several strings of LEDs. In Liquid Crystal Display (LCD) applications using LED backlights, it is often necessary for a controller to control several strings of LEDs in parallel with independent current settings for each string. The controller can then independently control the brightness of different sections of the LCD. Furthermore, the controller can turn different parts of the LCD on or off in a timed manner. In addition the image information is displayed on an LCD panel using separate logic to drive thin film transistor (TFT) LCD panels.

Conventional TFT LCD panels are driven by a timing controller (TCON) bias integrated circuits (IC), power supply, that provide multiple voltages with different current limits for driving the rows and columns of TFT panels. However, these conventional ICs are passive and don't include any intelligence about "future" (next frame) image data and are thus overdesigned to address any sudden change in the current requirements at points of load. Such overdesigning leads to unwanted extra costs.

SUMMARY OF THE INVENTION

A Predictive Power Control (PPC) device within a TCON Bias IC that addresses an "overdesign" inefficiency and enables a low cost solution. The PPC block utilizes the next frame image data and interacts with the PWM control block of internal regulators to proactively prepare the output voltages of the TCON Bias IC for the power requirements in one or more future frames, for example, thus leading to an optimal solution.

One embodiment includes a system and method for controlling a power regulator comprising: receiving, during a first cycle, future image property information related to a future image to be displayed on a display during a second cycle, said second cycle occurring after said first cycle, generating a power regulator control signal, prior to said second cycle, based upon the future image property information, and precharging the power regulator output voltage, during said second cycle based on the power regulator control signal.

Another embodiment includes a system and method for controlling a power regulator including receiving, during a first cycle, future image property information related to a future image to be displayed on a display during a second cycle, said second cycle occurring after said first cycle; generating a power regulator control signal, prior to said second cycle, based upon the future image property information; modifying a duty cycle of a power regulator for said second cycle, based on said power regulator control signal to reduce a maximum voltage ripple of said output voltage based upon the power regulator control signal, said power regulator output voltage coupled to a switch that assists in displaying said future image on said display during said second cycle.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

System Architecture

Figure 1:
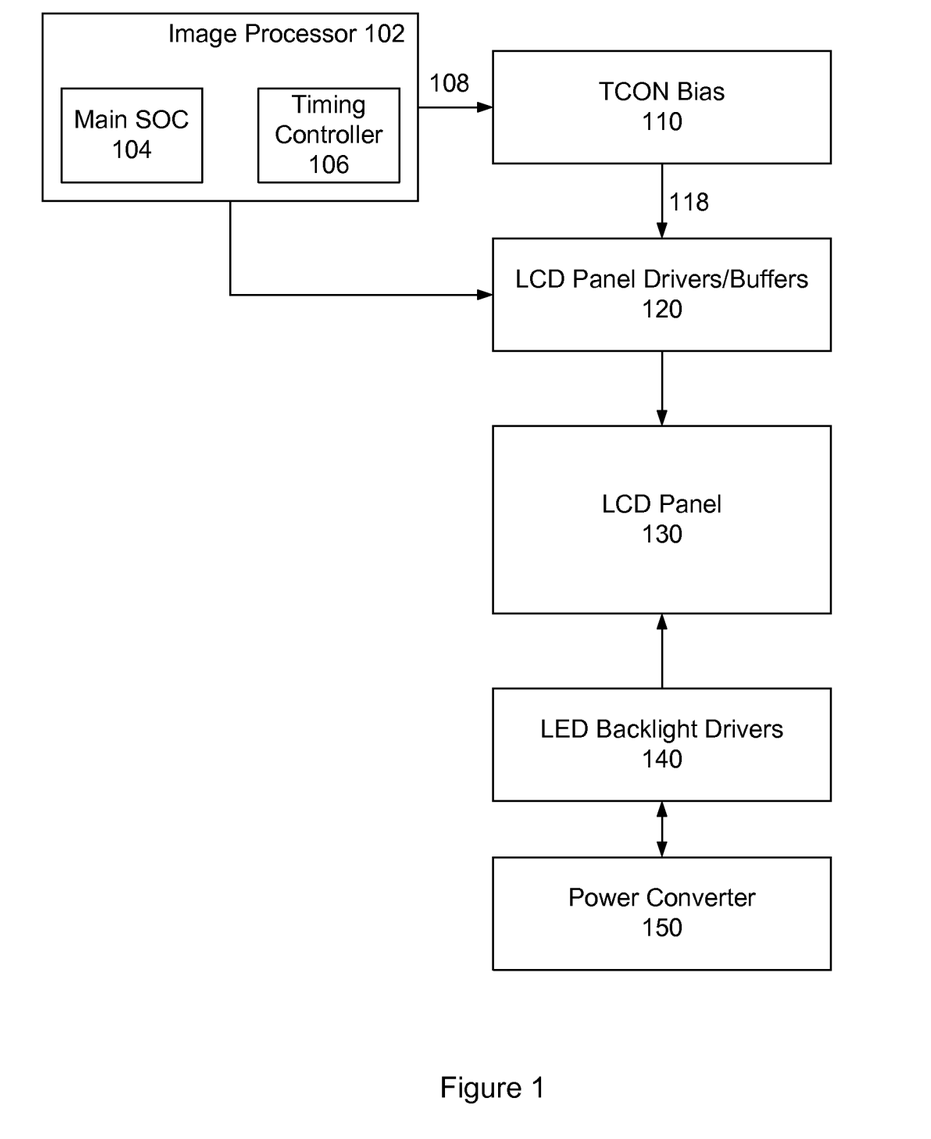
FIG. 1 illustrates a high level system for controlling an LCD panel in accordance with an embodiment of the present invention.

FIG. 1 illustrates a high level system for controlling an LCD panel in accordance with an embodiment of the present invention. The system includes an image processor 102 that can include a main system on a chip (SOC) 104 and a timing controller 106. The image processor 102 generates signals representing the image to be displayed. The image processor 102 can be conventional and generate values representing the image value for each pixel in the display. In embodiments of the present invention image information is sent to the TCON Bias module 110 (which is an intelligent power supply) and is described in more detail below. The TCON Bias module 110 provides power to various LCD panel drivers and buffers 120 which drive an image onto the LCD panel 130.

In an embodiment, the LCD panel 130 includes LED Backlights which are driven by LED backlight drivers 140 and a power converter 150. Additional detail about how the backlight can operate in various embodiments are set for in U.S. patent application Ser. No. 13/339,196 filed on Dec. 28, 2011, entitled Predictive Control of Power Converter for LED Driver, by Kesterson et al., which is incorporated by reference herein in its entirety.

In a backlight LCD television, LED backlight drivers 140 control LEDs to produce a backlight for the LCD panel since LCDs do not produce light. The LCD panel 130 comprises a matrix or grid of LCDs. In one embodiment each pixel of the image comprises three LCDs, each LCD controls one color of the pixel, e.g., red, green or blue in an RGB color system, each LCD is referred to as a sub-pixel in this example.

Each LCD has an associated switch, e.g., a conventional thin film transistor (TFT) (not shown). Each TFT is attached to a row signal and a column signal. The rows and columns of the LCD are driven by LCD panel drivers 120. In one embodiment, a row of LCDs is switched on, by applying a voltage to the gate of the associated TFT switch, and then voltage signals, e.g., data voltages, are applied to each of the columns representing the image values. In an embodiment, the data voltages are applied to the source terminal of each TFT for which image data is to be sent in the particular cycle. The voltage signal is stored in a TFT capacitor, e.g., an LC load capacitance, until the next refresh cycle of the image. The amount of voltage applied to an LCD affects the amount of light that can pass through the LCD.

TCON Bias 110 generates the voltages and the LCD panel drivers/buffers 120 apply them to the LCD panel 130 at the appropriate time based on, e.g., information from timing controller 106. Tcon Bias 110 receives an input voltage, e.g., 8V-14.7V, and generates voltage signals for the TFT source (16V) using a step-up regulator, TGT gate (e.g., 35V, −6V) using a charge pump and System logic (3.3V) using a step down regulator.

Figure 2:
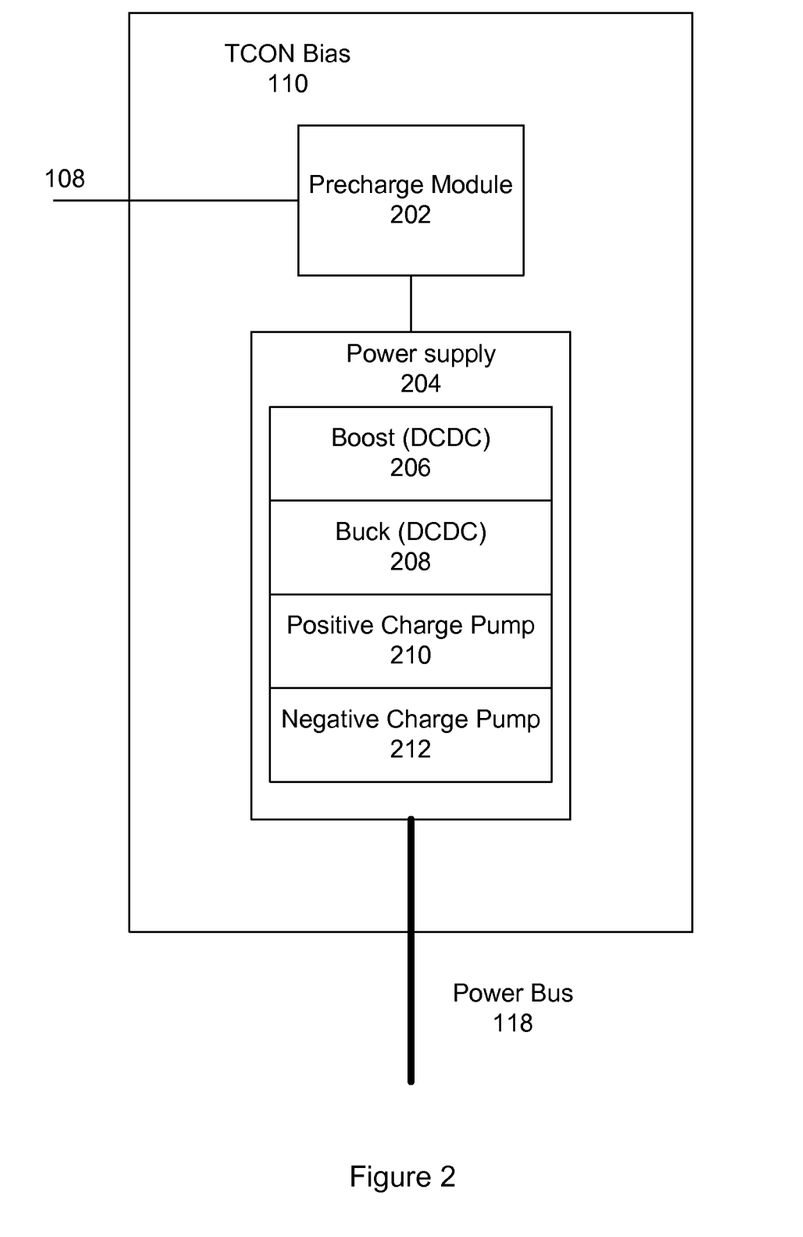
FIG. 2 illustrates a timing controller bias module in accordance with an embodiment of the present invention.

Conventional TCON Bias modules 110 are reactive in that they do not receive any information related to image data, for example information about future image frames or rows. In contrast embodiments of the invention receive information which can be used to modify the power signals output on the power bus 118. FIG. 2 illustrates a timing controller bias module (TCON Bias) 110 in accordance with an embodiment of the present invention. In embodiments, TCON Bias 110 can include a Precharge Module 202 which receives information from the image processor 102 such as next image frame and/or next image row information, for example. The Precharge Module 202 uses the information received from the image processor 102 to generate a power supply control signal which is sent to the power supply 204. In embodiments the power supply can include one or more of a Boost regulator 206 (a DCDC regulator), a Buck regulator 208 (a DCDC linear regulator), a positive charge pump 210, and/or a negative charge pump 212. The power supply generates output voltages to the power bus 118.

Figure 6A:
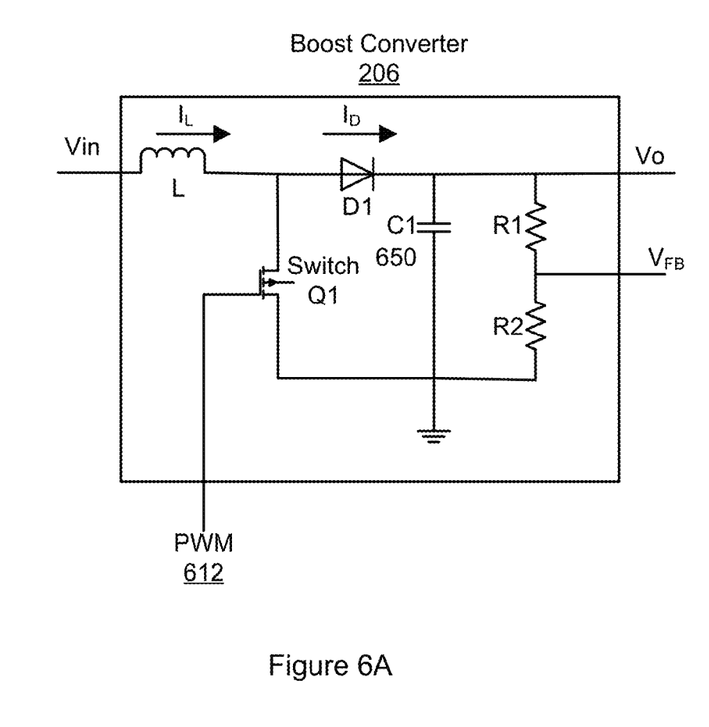
FIG. 6A illustrates an example architecture of a boost converter 206 that can be used as switching power converter/supply 204 in accordance with an embodiment of the present invention.

Embodiments of the invention use future image information such as next frame information, next row information etc, to precharge the power supply output. A benefit of precharging the power supply is to reduce voltage drops when a load is applied which reduces the size of the necessary capacitors in the power supply 204, e.g., capacitor C1 (650) in FIG. 6, as described below.

One example is when an image is displayed on an LCD panel 130. In this example an image to be displayed is one frame on a 120 Hz LCD panel 130. Accordingly the duration of each frame is 8.33 milliseconds ($\frac{1}{120}^{th}$ of a second). Assuming there are 1020 lines (rows), and the LCD displays the image row-by-row, e.g., using interlaced scanning or progressive scanning, then each row must be displayed in less than 8.17 microseconds.

Presuming that the TCON Bias IC 110 operates at 500 kHz—i.e., the PWM time period is 2 µS, then the available window of 8.17 µS means that for each row, the internal controller for the step-up/step-down regulator can only use 4 cycles, which may be insufficient to react to sudden changes in the required output current level. With prior information of the power demand of the next row (next block, next frame) internal regulators can respond better/faster. The precharge module 202 looks at future image information, e.g., next row, next frame, next block, to generate a predictive power control (PPC) value representing when a regulator/power supply 204 should start charging. If the PPC value for this row is higher than the last row's PPC value, then this row will need more power than the last row in order to perform well. Accordingly, the PWM duty cycle of the internal regulators will increase to respond to the increased power requirement. If the PPC value for this row is lower than the last row's PPC value, then this row will need less power than the last row. Accordingly, the PWM duty cycle of the internal regulators will decrease or remain the same.

For this example, presume that the image information for Row x+1 is available to the TCON Bias Gen IC 110 when Row x is under operation, e.g., in the process of being displayed by LED panel 130, e.g., when row x is being driven. The precharge module 201 uses an algorithm to calculate the PPC value for Row x+1 and sends this PPC value data to the internal regulators/power supply 204. Since the PPC value for Row x+1 is higher (implying that Row x+1 is brighter) than that of Row x, the precharge module 202 will increase the PWM duty cycle of the internal regulators to match the soon-to-increase power requirements, i.e., when row x+1 is driven. This will reduce the output voltage ripple and also help avoid any surge in current flow.

Alternatively, instead of row information, the predictive information can be the information in the next frame to be displayed and the VSYNC signal can be used as the synchronization signal.

Figure 4:
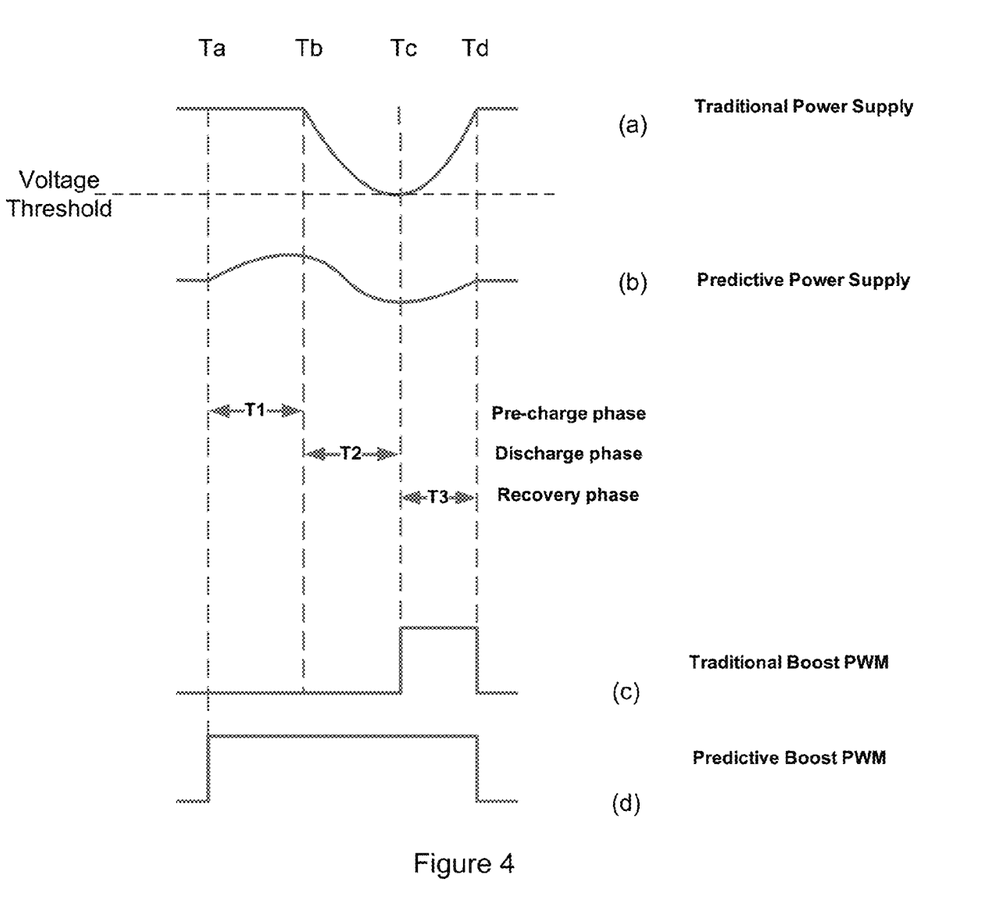
FIG. 4 illustrates waveforms associated with a power supply signal using conventional control or predictive control in accordance with an embodiment of the present invention.

FIG. 4 illustrates waveforms associated with a power supply signal using conventional control or predictive control in accordance with an embodiment of the present invention. FIG. 4($a$) is an illustration of a waveform of a conventional power supply that does not use predictive control. The Boost pulse width modulation (PWM) signal in FIG. 4($c$) generates the waveform in FIG. 4($a$). In conventional power supplies, a power signal has a target voltage level, such as the voltage level at time $T_a$. At time $T_b$ a load is applied, e.g., the LED image is displayed. The voltage level of the power signal starts to decrease at time $T_b$ and continues to decrease until a minimum voltage threshold is met at time $T_c$. At $T_c$ the traditional boost PWM generates an impulse signal that causes the voltage level of the power signal to rise until it reaches the target level at time $T_d$. Conventional power supplies are reactive in that the PWM signal is generated in response to the voltage dropping below a threshold value.

In contrast, embodiment of the invention uses a predictive methodology in which future image information is used in order to precharge the power supply by having a control signal, e.g., a PWM signal, initiate the charging of the power supply signal before the voltage drops below a threshold. In some circumstances, the PWM signal initiates precharging before the load is applied which significantly reduces the voltage drop and therefore a smaller capacitor can be used in the power supply.

With reference to FIG. 4(b) and FIG. 4(d). Based upon information received from the image processor 102, e.g., information related the next image frame or next row, the precharge module 202 determines that in order to reduce the voltage drop that a PWM control signal should be sent to the power supply 204 prior to time $T_c$. In some embodiments Tc is not determined, so a different threshold may be used or timing may be programmable using, for example, control registers, based on the power management specifications in order to balance the variation reduction without too much overshoot. In one example the power management specification can account for the load current and capacitor value(s). How early the PWM control signal goes high is dependent upon various factors described herein, such as future frame/row intensity information. In this example, as shown in FIG. 4(d), the PWM control signal goes high at time $T_a$ and stays on until time $T_d$. As seen in FIG. 4(b), since the load is not applied until time $T_b$, the voltage level of the predictive power supply signal increases between $T_a$ and $T_b$, when the load is applied at $T_b$ the voltage level drops (between $T_b$ and $T_c$) and the voltage level returns to the target level by time $T_d$. The variation of the voltage from the target level is significantly reduced (FIG. 4(b)) when additional information is used by the precharge module to proactively precharge when compared to the voltage variation in conventional power supplies shown in, for example, FIG. 4(a).

Figure 3:
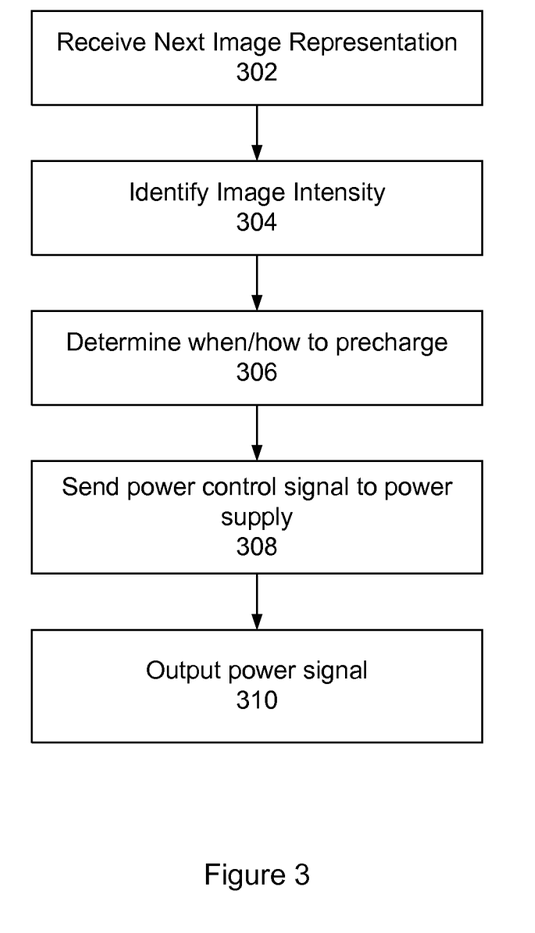
FIG. 3 illustrates a flow chart for generating an output signal using predictive control in accordance with an embodiment of the present invention.

A description of various embodiments with proactive charging is now set forth. FIG. 3 illustrates a flow chart for generating an output signal using predictive control in accordance with an embodiment of the present invention. For ease of discussion, an example is used in which information about the next frame is used to control when the power supply begins charging. The description herein also applies to the embodiment when different information is used, such as next row information or a display mode where the display duration may be shorter and more dynamic, e.g., in a 3D mode.

The image processor 102 receives 302 a representation of the next image to be displayed. The image processor can store this representation in buffers, e.g., image buffers. The image processor 102 (or another processor which has access to the next image representation) determines 304 an image intensity value representing the next image. There are a variety of ways, algorithms, that such an image intensity value can be determined. For example, in an embodiment the intensity values of each pixel are combined, e.g., summed, to identify a next image intensity total. In alternate embodiments image intensity information can be determined indirectly using, for example, a backlight PWM duty cycle in the situation where a local dimming LED backlight is used.

In an embodiment the following formula is used:

$$S_n = \beta_n \sum_n P_i + \beta_{n-1} \sum_{n-1} P_i$$

Where $S_n$ is the image intensity, $\beta_n$ and $\beta_{n-1}$ are weighting factors for the next image (n) and current image (n−1) being displayed, respectively. $P_i$ is the image intensity of each pixel in the image. The equation sums the image intensity for all pixels in image n and n−1 where the sum of the pixel intensity of each image can be weighted separately. For example, if $\beta_n=1$ and $\beta_{n-1}=0$ then the image intensity ($S_n$) is based only on the image intensity of the pixels in the next image to be displayed (i.e., at time n). If $\beta_{n-1}$ is equal to a value other than zero then the current image being displayed (at time n−1) contributes to image intensity ($S_n$). In an alternate embodiment (n) and (n−1) may refer to the next row, block or other grouping and the current row, block or other grouping.

In alternate embodiments intensity values for additional images can also be used, e.g., for images n+1, n+2, n−2, n−3 etc, and each can be weighted separately.

In an embodiment, the image processor 102 can then determine a value representing the total intensity based on $S_n$. In an embodiment, a predictive power control (PPC) count is generated where the PPC count is a value in a range, e.g., 0 to 15. In this example, a PPC count value of 0 occurs when the image is substantially dark and a PPC count of 15 occurs when the image is substantially white. In an embodiment the PPC count is in a the range of 0 to 15 can be substantially divided linearly so that the difference between a PPC count of 3 and 4 is substantially the same as the difference in intensity between a PPC count of 10 and 11. However, in alternate embodiments the PPC count can represent values in a non-linear manner.

As described above, in alternate embodiments, $S_n$ can be determined based on pixels in a row, block or other collection of pixels based on the next image to be displayed (time n), and/or other images (time n+1, n+2, n−1, n−2 etc). In addition, other equations and weighting can be used to determine an image (row, block) intensity value.

Image intensity information is received by the TCON bias device 110. In the example set forth above, the image intensity information is in the form of the PPC count. The precharge module 202 in the TCON bias device 110 determines 306 when to start charging the power output signal. In an embodiment, a PWM signal is generated (or a pump signal is generated) based upon, at least in part, the intensity of the next image to be displayed. In an embodiment the PPC count represents the intensity of the next image and is a value between 0 and 15. With reference to FIG. 4, in an embodiment the duration between $T_c$ (or $T_d$) and $T_a$ is linearly divided into fifteen ranges representing a time at which the PWM signal goes high to indicate that the power supply 204 should begin charging. The time of position $T_a$ is determined based upon the maximum duty cycle of the power supply. In embodiments, the time duration and start/stop point are related to the load current and external capacitor value so in an embodiment the duration and start/stop points can be programmable using, for example, control registers, based on power management specifications, for example.

Accordingly, if the PPC count is zero the PWM signal goes high at time $T_c$, if the PPC count is 8, the PWM signal goes high at approximately time $T_b$, if the PPC count is fifteen then the PWM signal goes high at approximately $T_a$, that is, even before the load is applied to the power bus signal 118. This example is merely exemplary and it is envisioned that other techniques for determining when to start charging can be used based upon future image information.

This predictive power control system and method is proactive as it utilizes image information from future frame(s), row(s), and/or block(s) (for example) to start charging the power supply. This is in contrast to conventional systems that are reactive and start charging based only on the image currently being displayed.

The precharge module 202 sends 308 the power control signal, e.g., PWM signal, to the power supply 204. The power supply 204 then generates 310 the power signals that are output on power bus 118. The power supply 204 can include one or more of a boost converter 206, a buck converter 208, a positive charge pump 210 and/or a negative charge pump 212, for example. The operation of these in response to power control signal is known. An example for a boost converter 206 is now described with reference to FIGS. 6A and 6B.

FIG. 6A illustrates an example architecture of a boost converter 206 that can be used as switching power converter/supply 204. In a boost converter 206, energy is stored in inductor L when switching transistor Q1 is turned on. When switching transistor Q1 turns off, the energy is transferred to capacitor C1 (650) via diode D1 and is seen as an output voltage $V_O$. A voltage divider comprising resistors R1 and R2 are coupled to produce a sensed feedback voltage $V_{FB}$ representative of $V_O$. $V_{FB}$ may be utilized as feedback voltage $V_O$ may be coupled to the power bus 118.

Figure 6B:
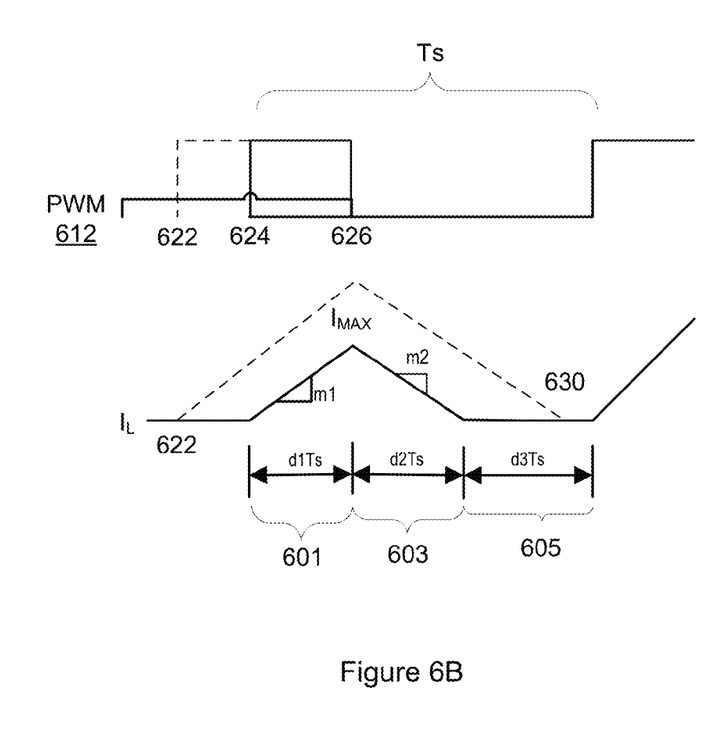
FIG. 6B illustrates waveform diagrams for a PWM signal driving a boost converter and an inductor current $I_L$ through the boost converter when operating in a discontinuous conduction mode (DCM) in accordance with an embodiment of the present invention.

FIG. 6B illustrates waveform diagrams for a PWM signal 612 driving boost converter 206 and an inductor current $I_L$ through boost converter 206 when operating in a discontinuous conduction mode (DCM). During time period 601, PWM signal 612 is asserted, turning on switching transistor Q1. Inductor current $I_L$ increases at a rate $m_1$ as inductor L charges. Time period 601 is known as the charge time and is given by $d_1 T_S$, where $d_1$ is a duty cycle of PWM signal 312 and $T_S$ is the period of PWM signal 612. During time period 603, PWM signal 612 is low, turning off switching transistor Q1. Inductor current $I_L$ decreases at a rate of $m_2$ as inductor L discharges, thereby providing diode current $I_D$ and producing output voltage $V_O$ across capacitor C1. Time period 603 is the discharge time, and is given by $d_2 T_S$ where $d_2$ is a percentage of period $T_S$ when inductor L is discharging. During time period 605, inductor current $I_L$ is approximately zero because inductor L has completely discharged. Time period 605 is known as the dead time, and is given by $d_3 T_S$ where $d_3$ is a percentage of period $T_S$ when the inductor current is zero, after the discharge cycle and before the start of the next PWM cycle.

As described above, the precharge module 202 determines when the PWM signal should go high. In this example, PWM signal 612 goes high at time 622 and stays on until 626. The dotted line in FIG. 6B represents the PWM signal and $I_L$ signal as modified based upon the predictive image information from precharge module 202.

Figure 5:
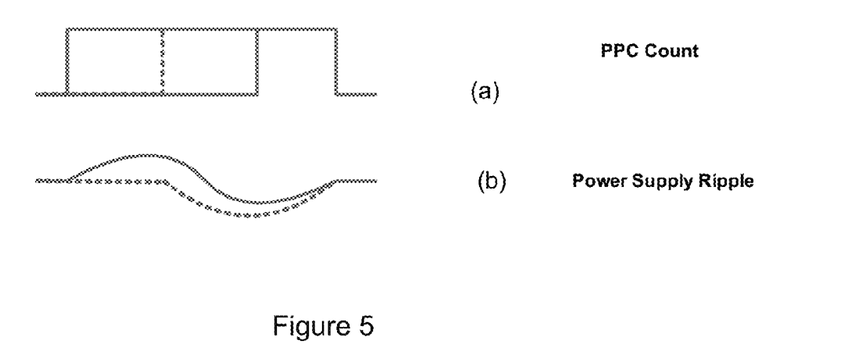
FIG. 5 illustrates examples of precharging signals by the TCON Bias module and the affect on a power supply ripple in accordance with an embodiment of the present invention.

FIGS. 4(b) and (d) and FIGS. 5(a) and (b) represent the power supply signal and the predictive PWM signal to a boost converter 206 in accordance with embodiments of the present invention. FIG. 4(d) and FIG. 5(a) illustrates a predictive PWM signal generated by the Precharge Module 202. Instead of activating the PWM signal at time $T_c$, as is done in conventional systems based on a drop in the voltage (see FIG. 4(a)), the predictive boost PWM signal turns on/activates at time $T_a$, this is at a time prior to the load being applied. In this example the PPC count value is at or near its maximum value, e.g., 15. The power supply voltage signal is shown in FIG. 4(b) and as a solid line in FIG. 5(b). The absolute value variation of the voltage signal from the target voltage is significantly less than the absolute value variation of the voltage signal from the target voltage in the traditional power supply example (see FIG. 4(a)). This decrease in voltage variation enables the power supply 204 to use smaller capacitors, e.g., C1 (650), which decreases overall system costs.

FIG. 5 represents the predictive PWM signal (FIG. 5(a)) and the power supply signal (FIG. 5(b)) when the PPC count is at a value in the middle of the range, e.g., approximately 7-8 in the example set forth above. In this example, as shown by dotted lines in FIG. 5, the PWM signal is activated at time $T_b$, which is approximately the same time as when the load is applied and before when the voltage of the power supply drops below a threshold, e.g., at time $T_c$. The power supply voltage signal is shown in FIG. 5(b) as a dashed line. As is the case when the PWM signal was activated at time $T_a$, the absolute value variation of the voltage signal from the target voltage is still significantly less than the absolute value variation of the voltage signal from the target voltage in the traditional power supply example (see FIG. 4(a)). As described above, this decrease in voltage variation enables the power supply 204 to use smaller capacitors, e.g., C1 (650), which decreases overall system costs.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm.

It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relates to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

Upon reading this disclosure, those of skill in the art will appreciate still additional alternative designs for the system. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method for controlling a power regulator comprising:
receiving, during a first cycle corresponding to a display duration of a current image, future image property information related to a future image to be displayed on a display during a second cycle after display of the current image, said second cycle occurring after said first cycle;
generating a power regulator control signal, prior to said second cycle and prior to display of the future image, based upon the future image property information; and
precharging a power regulator output voltage based on the power regulator control signal, prior to said second cycle by a duration of time that depends on the future image property information, and prior to the power regulator output voltage dropping below a threshold value, said power regulator output voltage coupled to a switch that assists in displaying said future image on said display during said second cycle.

2. The method of claim 1, wherein said future image property information is a load on at least a portion of said display when displaying said future image during said second cycle.

3. The method of claim 2, wherein said portion of said display includes at least one of a row or a column of a thin film transistor liquid crystal display (TFT LCD).

4. The method of claim 1, wherein said power regulator controls a liquid crystal display (LCD) panel.

5. The method of claim 1, wherein said future image property information can include information about the intensity of the future image.

6. A method for controlling a power regulator comprising:
receiving, during a first cycle corresponding to a display duration of a current image, future image property information related to a future image to be displayed on a display during a second cycle after display of the current image, said second cycle occurring after said first cycle;
generating a power regulator control signal, prior to said second cycle and prior to display of the future image, based upon the future image property information; and
modifying a duty cycle of a power regulator for said second cycle to turn on the power regulator prior to said second cycle by a duration of time that depends on the future image property information, the duty cycle modified based on said power regulator control signal to reduce a maximum voltage ripple of an output voltage of the power regulator, said power regulator output voltage coupled to a switch that assists in displaying said future image on said display during said second cycle.

7. The method of claim 6, wherein said future image property information is a load on at least a portion of said display when displaying said future image during said second cycle.

8. The method of claim 7, wherein said portion of said display includes at least one of a row or a column of a thin film transistor liquid crystal display (TFT LCD).

9. The method of claim 6, wherein said step of modifying the duty cycle of the power regulator results in an increase in the output voltage prior to the output voltage dropping below a voltage threshold during said second cycle.

10. The method of claim 6, wherein said power regulator controls a liquid crystal display (LCD) panel.

11. The method of claim 6, wherein said future image property information can include information about the intensity of the future image.

12. A predictive power control system for controlling a power regulator comprising:

a precharge module coupled to receive, during a first cycle corresponding to a display duration of a current image, future image property information related to a future image to be displayed on a display during a second cycle after display of the current image, said second cycle occurring after said first cycle, and to generate, prior to the second cycle and prior to display of the future image, a power regulator control signal based upon the future image property information; and a power regulator, coupled to said precharge module, to generate a power regulator output voltage signal prior to said second cycle by a duration of time that depends on the future image property information, the power regulator output voltage signal generated based upon said power regulator control signal, said power regulator output voltage coupled to a switch that assists in displaying said future image on said display during said second cycle.

13. The system of claim 12, wherein said power regulator output voltage signal increases prior to the output voltage dropping below a threshold value.

14. The system of claim 12, wherein said future image property information is a load on at least a portion of said display when displaying said future image during said second cycle.

15. The system of claim 14, wherein said portion of said display includes at least one of a row or a column of a thin film transistor liquid crystal display (TFT LCD).

16. The system of claim 12, wherein said power regulator output voltage increases prior to the output voltage dropping below a voltage threshold during said second cycle.

17. The system of claim 12, wherein said power regulator controls a liquid crystal display (LCD) panel.

18. The system of claim 12, wherein said future image property information includes information about the intensity of the future image.

19. The system of claim 12, wherein said power regulator modifies a duty cycle for said second cycle to turn on the power regulator prior to said second cycle by the duration of time that depends on the future image property information, the duty cycle modified based on said power regulator control signal to reduce a maximum voltage ripple of said output voltage based upon the power regulator control signal.

20. The system of claim 19, wherein said future image property information is a load on at least a portion of said display when displaying said future image during said second cycle.

21. The system of claim 20, wherein said portion of said display includes at least one of a row or a column of a thin film transistor liquid crystal display (TFT LCD).

22. The system of claim 19, wherein modifying the duty cycle of the power regulator results in an increase in the output voltage prior to the output voltage dropping below a voltage threshold during said second cycle.

23. The system of claim 19, wherein said power regulator controls a liquid crystal display (LCD) panel.

24. The system of claim 19, wherein said future image property information includes information about the intensity of the future image.

25. The system of claim 12, wherein said future image property information includes a weighted sum of image intensities of two or more images, including said future image, to be displayed after display of the current image, the two or more images weighted differently in the weighted sum.

* * * * *